(12) United States Patent
Tian et al.

(10) Patent No.: US 7,927,476 B2
(45) Date of Patent: Apr. 19, 2011

(54) INJECTION METHOD FOR MICROFLUIDIC CHIPS

(75) Inventors: Wei-Cheng Tian, Clifton Park, NY (US); Erin Jean Finehout, Clifton Park, NY (US); Li Zhu, Clifton Park, NY (US); Jun Xie, Niskayuna, NY (US)

(73) Assignee: General Electric Company, Niskayuna, NY (US)

( * ) Notice: Subject to any disclaimer, the term of this patent is extended or adjusted under 35 U.S.C. 154(b) by 227 days.

(21) Appl. No.: 12/341,233

(22) Filed: Dec. 22, 2008

(65) Prior Publication Data

US 2010/0155244 A1 Jun. 24, 2010

(51) Int. Cl.
*G01N 27/447* (2006.01)
*G01N 27/453* (2006.01)
(52) U.S. Cl. ........................ 204/453; 204/604
(58) Field of Classification Search .......... 204/451–455, 204/601–605
See application file for complete search history.

(56) References Cited

U.S. PATENT DOCUMENTS

| | | | |
|---|---|---|---|
| 4,879,247 A | 11/1989 | Ohlson | |
| 5,171,563 A | 12/1992 | Abrams et al. | |
| 5,644,395 A | 7/1997 | Folta | |
| 5,976,336 A | 11/1999 | Dubrow et al. | |
| 6,251,343 B1 | 6/2001 | Dubrow et al. | |
| 6,375,817 B1 * | 4/2002 | Taylor et al. | 204/453 |
| 6,953,567 B2 | 10/2005 | Griffiths | |
| 7,005,050 B2 * | 2/2006 | Burns et al. | 204/453 |
| 7,211,240 B2 | 5/2007 | Arbogast et al. | |
| 2002/0197736 A1 | 12/2002 | Amirkhanian | |
| 2005/0150766 A1 | 7/2005 | Manz et al. | |

FOREIGN PATENT DOCUMENTS

| | | |
|---|---|---|
| EP | 0268406 A2 | 11/1987 |
| WO | 9604547 A1 | 2/1996 |
| WO | 9934220 A2 | 7/1999 |

OTHER PUBLICATIONS

P.F. Man et al., "Microfluidic Plastic Capillaries on Silicon Substrates: A New Inexpensive Technology for Bioanalysis Chips," Center for Integrated Sensors and Circuits, IEEE, 48109-2122, 0-7803-3744-1, 1997, pp. 311-316.

P.Y. Chiou et al., "Massively parallel manipulation of single cells and microparticles using optical images," Nature, vol. 436, Jul. 2005, pp. 370-372.

\* cited by examiner

*Primary Examiner* — Alex Noguerola
(74) *Attorney, Agent, or Firm* — Jenifer E. Haeckl

(57) ABSTRACT

Methods and systems for injecting a sample during electrophoresis, that generally comprise: loading a sieving matrix through a first end of a separation channel; having the an end of the sieving matrix at a set distance from the intersection of the separation channel and a loading channel; pressure loading a sample through the loading channel and filling an empty portion of the separation channel; applying an electric field across the separation channel while flowing a washing buffer through the loading channel; and injecting a portion of the sample into the separation channel, wherein the portion of the sample injected is of a size that is determined by a distance between the end of the sieving matrix and the intersection of the loading and separation channels.

10 Claims, 2 Drawing Sheets

INJECTION METHOD FOR MICROFLUIDIC CHIPS

BACKGROUND

Figure 1:
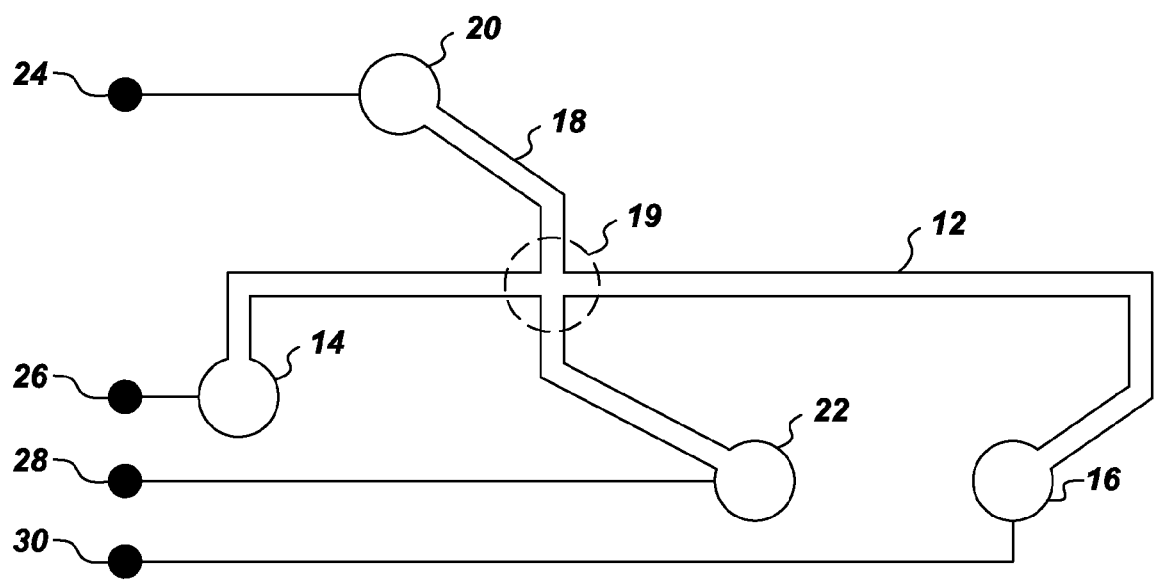
Figure 2A:
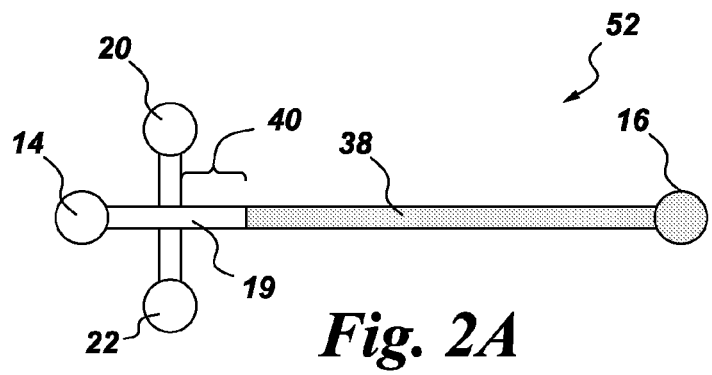
Figure 2B:
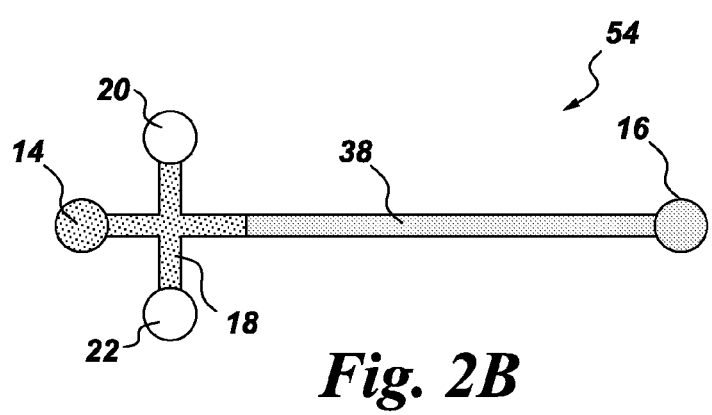
Figure 2C:
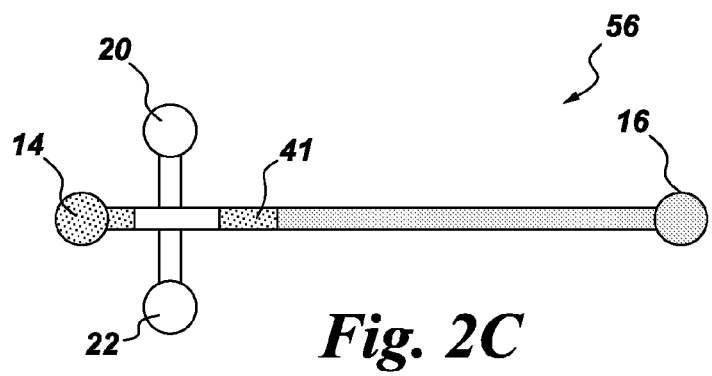
Figure 2D:
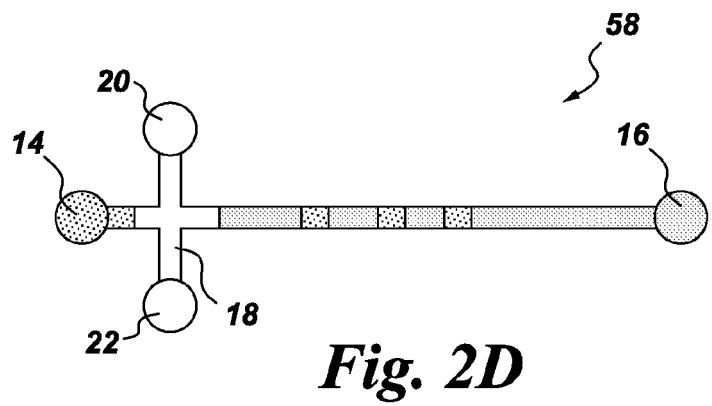

The invention relates generally to microfluidic systems and to methods for loading microfluidic chips in such systems.

Electrophoretic separation of biomolecules is very important in modern biology and biotechnology applications such as DNA sequencing, protein molecular weight determination and genetic mapping. Electrophoresis is a process by which individual molecular species are separated in a conductive medium (such as a liquid solution or a cross-linked polymer) by applying an electric field. The charged molecules migrate through the solution and separate into distinct bands due to their mobility difference through the media. The rates are influenced by factors such as a viscosity of the solution, a mass and charge of the molecules, and a strength and duration of the electric field.

An increase in a voltage gradient (V/cm) applied to the electrophoretic device results in a corresponding decrease in the time needed to perform the separation. However, increasing the voltage gradient is governed by certain constraints. For example, increasing the voltage gradient beyond a certain point may result in an increase in joule heating which would in turn alter the properties of the medium in which the molecules are being separated. The change of the medium properties leads to an increase in sample diffusion and thus degraded the separation resolution. In order to overcome the above limitations, electrophoresis can be performed in a capillary or miniaturized channel. The large surface-area-to-volume ratio of the electrophoretic devices offers efficient dissipation of Joule heat, allowing higher electric field to be used, thus resulting in the shorter analysis time and better separation efficiency.

Microchips are small microfluidic devices that perform chemical and physical operations such as capillary electrophoresis with microscale sample volumes. These devices often have the benefits of fast reactions, rapid detection, small reagent consumption, ease of automation and simple transfer between reaction vessels. Microfluidic devices are commonly referred to as "lab-on-a-chip."

In microchip electrophoresis, a sample is loaded in a sample reservoir and a voltage is applied between a sample reservoir and a waste reservoir to move sample into the loading channel. However, proteins with different mobilities may be separated during this loading process, resulting in a biased injection, in which the sample injected into the separation channel does not represent the original sample composition.

Therefore, there is a need for a microfluidic device that provides sample-loading techniques where the sample composition is uniform at the injection point.

BRIEF DESCRIPTION

An example of the method of the invention, for injecting a sample during electrophoresis, generally comprises: loading a sieving matrix through a first end of a separation channel; having an end of the loaded sieving matrix at a set distance from the intersection of the separation channel and a loading channel; pressure loading a sample through the loading channel and filling an empty portion of the separation channel; applying an electric field across the separation channel while flowing a washing buffer through the loading channel; and injecting a portion of the sample into the separation channel, wherein the portion of the sample injected is of a size that is determined by a distance between the end of the sieving matrix and the intersection of the loading and separation channels. The method may further comprise controlling the portion of the sample being injected in the separation channel.

Another example of the method for injecting a sample during electrophoresis, generally comprises: loading a sieving matrix through a first end of a separation channel; having an end of the sieving matrix at a set distance from the intersection of the separation channel and a loading channel; pressure loading a sample through the loading channel and filling the empty portion of the separation channel; applying an electrical field across the separation channel and a pull back voltage on the loading channel; and injecting a portion of the sample into the separation channel, wherein the portion is of a size that is determined by the distance between the end of the sieving matrix and the intersection of the loading and separation channels.

In at least one of the examples, the separation channel and the injection channel intersect at a four-way junction. In other examples, the separation channel and the injection channel intersect at a three-way junction.

An embodiment of the microfluidic system of the invention, for injecting a sample during electrophoresis, generally comprises: a separation channel adapted to receive a sieving matrix loaded through a first end of a separation channel, wherein once the sieving matrix is loaded, it has an end that is at a set distance from the intersection of the separation channel and a loading channel; and a device for applying an electric field across the separation channel while flowing a buffer through the loading channel, wherein, when a sample is pressure loaded through the loading channel to fill an empty portion of the separation channel, it is loaded in a portion, the size of which is determined by the distance between the end of the sieving matrix and an intersection of the loading and separation channels.

DRAWINGS

These and other features, aspects, and advantages of the present invention will become better understood when the following detailed description is read with reference to the accompanying drawings in which like characters represent like parts throughout the drawings, wherein:

FIG. 1 is a an embodiment of a microchip adapted to implement an example of the method of the invention; and FIGS. 2A-D illustrate one method by which a sample can be injected into an embodiment of the system of the invention.

DETAILED DESCRIPTION

The methods and system are generally designed to enable loading samples having a consistent size into a microfluidic device during electrophoresis. The methods generally comprise: loading a sieving matrix through a first end of a separation channel; having an end of the loaded sieving matrix at a set distance from the intersection of the separation channel and a loading channel; pressure loading a sample through the loading channel and filling an empty portion of the separation channel; applying an electric field across the separation channel while flowing a washing buffer through the loading channel; and injecting a portion of the sample into the separation channel, wherein the portion of the sample injected is of a size that is determined by a distance between the end of the sieving matrix and the intersection of the loading and separation channels. The methods may further comprise controlling the portion of the sample being injected in the separation channel.

The system for injecting a sample during electrophoresis, generally comprises: a separation channel adapted to receive the sieving matrix loaded through a first end of a separation channel, wherein once the sieving matrix is loaded, the sieving matrix has an end that is at a set distance from the intersection of the separation channel and a loading channel; and a device for applying an electric filed across the separation channel while flowing a buffer through the loading channel, wherein, when a sample is pressure loaded through the loading channel to fill an empty portion of the separation channel, it is loaded in a portion, the size of which is determined by the distance between the end of the sieving matrix and an intersection of the loading and separation channels.

FIG. 1 shows an embodiment of a microchip of the system. Microchip 10 comprises separation channel 12 and loading channel 18. Separation channel 12 is an elongated channel including two wells 14 and 16 disposed at its ends. The separation channel is configured to receive a sieving matrix through well 16. In one embodiment the separation channel is configured to receive a sample through well 14. Electrodes 26 and 30 extend from the wells 14 and 16, respectively. For applications involving electrophoresis, one or more voltage sources may be used to apply a voltage across the separation channel.

Loading channel 18 is in fluid communication with the separation channel. The loading channel comprises two wells 20 and 22. The injection channel is configured to receive a sample or washing buffer. Electrodes 24 and 28 extend from the wells 20 and 22 respectively.

In one embodiment, the separation channel and the loading channel intersect at a four-way junction as shown by reference numeral 19. In another embodiment, the separation channel and the injection channel intersect at a three-way junction.

FIGS. 2A-D illustrate an example of the method by which a sample can be loaded into a microchip device. The following example of the method, is adapted for use in microchips having the injection channel and the separation channel forming a four-way junction or three-way junction.

In step 52, a sieving matrix 38 is loaded through a first end of a separation channel. In one embodiment, the sieving matrix is loaded through well 16 of microchip 10. In a more specific embodiment, the loading of the sieving matrix is performed in a controlled manner so that one end of the sieving matrix is at a fixed distance 40 from the channel intersection 19. The distance 40 between the junction 19 and the edge of the sieving matrix defines a sample plug volume. In another embodiment, a predetermined amount of the sieving matrix is loaded into the separation channel to achieve the distance 40 between the channel intersection 19 and the edge of the sieving matrix.

In step 54, a sample is pressure loaded through the loading channel 18 and into the portion of the separation channel that is not filled with sieving matrix. In one embodiment, the sample is pressure loaded through well 14 of the microchip 10.

In step 56, an electric field is applied between wells 14 and 16. At the same time, pressure is used to flow washing buffer through the loading channel. Examples of the buffer include, but are not limited, Tris-HCl and TBE. A sample plug 41, defined by the distance between the channel intersection and edge of the gel, is injected into the separation channel while the flow of washing buffer is maintained to push away the excess sample in the loading channel.

As another example, an electrical field is applied between wells 14 and 16 to pull sample into the separation channel. At the same time an electrical field is applied between wells 20 & 14 and between wells 22 & 14 to pull any sample remaining in the loading channel into wells 20 and 22. This is referred to herein as a pull back voltage. Since the sample is loaded by capillary force, the composition of the sample that is injected into the separation channel is uniform.

In step 58, the voltage continues to be applied across the separation channel, thereby separating the components of sample plug 41 in the separation channel. In one embodiment, the separation voltage ranges from 200 V/cm to 500 V/cm. In one embodiment, the voltage is applied at electrodes 26 and 30.

While only certain features of the invention have been illustrated and described herein, many modifications and changes will occur to those skilled in the art. It is, therefore, to be understood that the appended claims are intended to cover all such modifications and changes as fall within the true spirit of the invention.

The invention claimed is:

1. A method for injecting a sample during electrophoresis, the method comprising:
   loading a sieving matrix through a first end of a separation channel;
   having an end of the sieving matrix at a set distance from the intersection of the separation channel and a loading channel;
   pressure loading a sample through the loading channel and filling an empty portion of the separation channel;
   applying an electric field across the separation channel while flowing a washing buffer through the loading channel; and
   injecting a portion of the sample into the separation channel, wherein the portion of the sample injected is of a size that is determined by a distance between the end of the sieving matrix and the intersection of the loading and separation channels.

2. The method of claim 1, wherein the separation channel and the injection channel intersect at a four-way junction.

3. The method of claim 1, wherein the separation channel and the injection channel intersect at a three-way junction.

4. The method of claim 1, further comprising controlling the portion of the sample being injected in the separation channel.

5. A method for injecting a sample during electrophoresis, the method comprising:
   loading a sieving matrix through a first end of a separation channel;
   having an end of the sieving matrix at a set distance from the intersection of the separation channel and a loading channel;
   pressure loading a sample through the loading channel and filling the empty portion of the separation channel;
   applying an electrical field across the separation channel and a pull back voltage on the loading channel; and
   injecting a portion of the sample into the separation channel, wherein the portion is of a size that is determined by the distance between the end of the sieving matrix and the intersection of the loading and separation channels.

6. The method of claim 5, wherein the separation channel and the injection channel intersect at a four-way junction.

7. The method of claim 5, wherein the separation channel and the injection channel intersect at a three-way junction.

8. A microfluidic system, for injecting a sample during electrophoresis, comprising:
   a separation channel adapted to receive a sieving matrix loaded through a first end of a separation channel, wherein once the sieving matrix is loaded, it has an end that is at a set distance from the intersection of the separation channel and a loading channel; and a device for applying an electric field across the separation channel while flowing a buffer through the loading channel, the system configured to pressure load a sample pressure loaded through the loading channel to fill an empty portion of the separation channel, it is loaded in a portion, the size of the portion being determined by the distance between the end of the sieving matrix and an intersection of the loading and separation channels.

9. The system of claim 8, wherein the separation channel and the injection channel intersect at a four-way junction.

10. The system of claim 8, wherein the separation channel and the injection channel intersect at a three-way junction.

* * * * *